(12) United States Patent
Kortge

(10) Patent No.: US 7,949,375 B2
(45) Date of Patent: May 24, 2011

(54) RELIABILITY FOR WIRELESS DATA COMMUNICATIONS

(75) Inventor: James M. Kortge, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 917 days.

(21) Appl. No.: 11/166,746

(22) Filed: Jun. 24, 2005

(65) Prior Publication Data

US 2006/0293040 A1 Dec. 28, 2006

(51) Int. Cl.
*H04M 1/00* (2006.01)

(52) U.S. Cl. .............. 455/569.2; 455/418; 455/419; 455/425; 455/435.2; 455/435.3

(58) Field of Classification Search .......... 455/461, 455/418–419, 404.2, 336.2, 432.3, 437, 370.3, 455/569.2, 425, 435.2–435.3, 448, 369.2, 455/404.1, 436

See application file for complete search history.

(56) References Cited

U.S. PATENT DOCUMENTS

| | | | |
|---|---|---|---|
| 6,580,916 B1 * | 6/2003 | Weisshaar et al. | 455/456.1 |
| 7,248,861 B2 * | 7/2007 | Lazaridis et al. | 455/414.1 |
| 2003/0039237 A1 * | 2/2003 | Forslow | 370/352 |
| 2003/0182419 A1 * | 9/2003 | Barr et al. | 709/224 |
| 2004/0132467 A1 * | 7/2004 | Hull et al. | 455/458 |
| 2004/0147289 A1 * | 7/2004 | Paljug et al. | 455/562.1 |
| 2006/0173587 A1 * | 8/2006 | Oesterling et al. | 701/2 |
| 2006/0195612 A1 * | 8/2006 | Alvarez Arevalo et al. | 709/246 |

* cited by examiner

*Primary Examiner* — Wayne Cai

(74) *Attorney, Agent, or Firm* — Ingrassia Fisher & Lorenz, P.C.

(57) ABSTRACT

Methods and apparatus are provided for using a proxy communication module within a vehicle telematics unit to provide external data connectivity for vehicle applications. The method comprises receiving a request from one or more vehicle applications to retrieve data from a server on an external network. In response to the request, a wireless proxy data communication channel is established between the proxy communication module in the vehicle telematics system and the server. The requested data is received from the server via the wireless proxy data communication channel and communicated from the proxy communication module to the one or more vehicle applications.

13 Claims, 2 Drawing Sheets

RELIABILITY FOR WIRELESS DATA COMMUNICATIONS

TECHNICAL FIELD

The present invention generally relates to wireless data communications, and more particularly relates to a proxy communication module in a vehicle telematics unit that provides external data connectivity to any of the vehicle applications for improved reliability.

BACKGROUND OF THE INVENTION

Applications running on a telematics platform in a vehicle may require data communications with computer systems outside of the vehicle. For example, one application may be designed to collect vehicle diagnostic data and transmit the collected data to a central server for further processing. Another application may transmit a request for local traffic or weather. Still another application may request entertainment or news updates. To accomplish these communications, each of the vehicle applications in the telematics platform must have the necessary communications software and be configured to establish a temporary data link between the vehicle and computer systems outside of the vehicle. This additional communications software for each of the applications increases the complexity and size of the applications.

The vehicle applications requesting data transmission between the telematics platform and computer systems outside of the vehicle may not be tolerant of communications errors during connection. For example, if an application requests data from a computer system and the connection fails during data transmission, the entire process is halted and the vehicle application must re-establish a communications link with the computer system and request the information again. This takes time and resources away from the vehicle applications primary function.

There are at least two ways that the data transmission can fail. The first is if a socket connection between the vehicle application and the remote server experiences an unrecoverable error. This error may be caused by, among other things, internet network outage, heavy load on the server, or unrecoverable packet loss or corruption during wireless transmission. The second is if data connectivity between the vehicle application and the cellular carrier is lost unexpectedly. This may occur because of fading of the radio-frequency channel, interference, or network outage.

Accordingly, it is desirable to provide a system and method for improved reliability for wireless data communications between vehicle applications in a telematics platform and computer systems outside of the vehicle. In addition, it is desirable to reduce the complexity and size of the vehicle applications. Furthermore, other desirable features and characteristics of the present invention will become apparent from the subsequent detailed description and the appended claims, taken in conjunction with the accompanying drawings and the foregoing technical field and background.

SUMMARY OF THE INVENTION

An apparatus and method is provided for a vehicle telematics system using a proxy communication module to provide external data connectivity for a vehicle application. The method comprises receiving a request from one or more vehicle applications to communicate with a server on an external network. In response to the request, a wireless proxy data communication channel is established between a proxy communication module in the vehicle telematics system and the server. The requested data is received from the server via the wireless proxy data communication channel and communicated from the proxy communication module to the one or more vehicle applications.

Another method is provided for a vehicle telematics system having a proxy communication module. The method comprises receiving a request from one or more vehicle applications to retrieve data from a server on an external network. In response to the data request, the method selects a preferred wireless data communication channel from a plurality of available wireless data communication channels for use as a wireless proxy data communication channel for the vehicle telematics system. Thereafter, the system establishes the wireless proxy data communication channel between a proxy communication module in the vehicle telematics system and the server.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may-be realized by any number of hardware, software, and/or firmware components configured to perform the specified functions. For example, an embodiment of the invention may employ various components, e.g., servers, modems, digital signal processing, wired or wireless connections, or the like, which may carry out a variety of functions under the control of one or more microprocessors or other control devices. In addition, those skilled in the art will appreciate that the present invention may be practiced in conjunction with any number of practical vehicle computer system platforms, architectures, and deployments, and any number of practical communication system platforms, architectures, and deployments, and that the particular system described herein is merely one exemplary application for the invention.

For the sake of brevity, conventional techniques related to communication systems, wireless systems, vehicle systems and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description may refer to components or features being "connected" or "coupled" together. As used herein, unless expressly stated otherwise, "connected" means that one component/feature is directly or indirectly connected to another component/feature, and not necessarily mechanically. Likewise, unless expressly stated otherwise, "coupled" means that one component/feature is directly or indirectly coupled to another component/feature, and not necessarily mechanically. Thus, although the schematic block diagrams depict example arrangements of elements, additional intervening elements, devices, features, or components may be present in an actual embodiment (assuming that the functionality of the systems or subsystems are not adversely affected).

Figure 1:
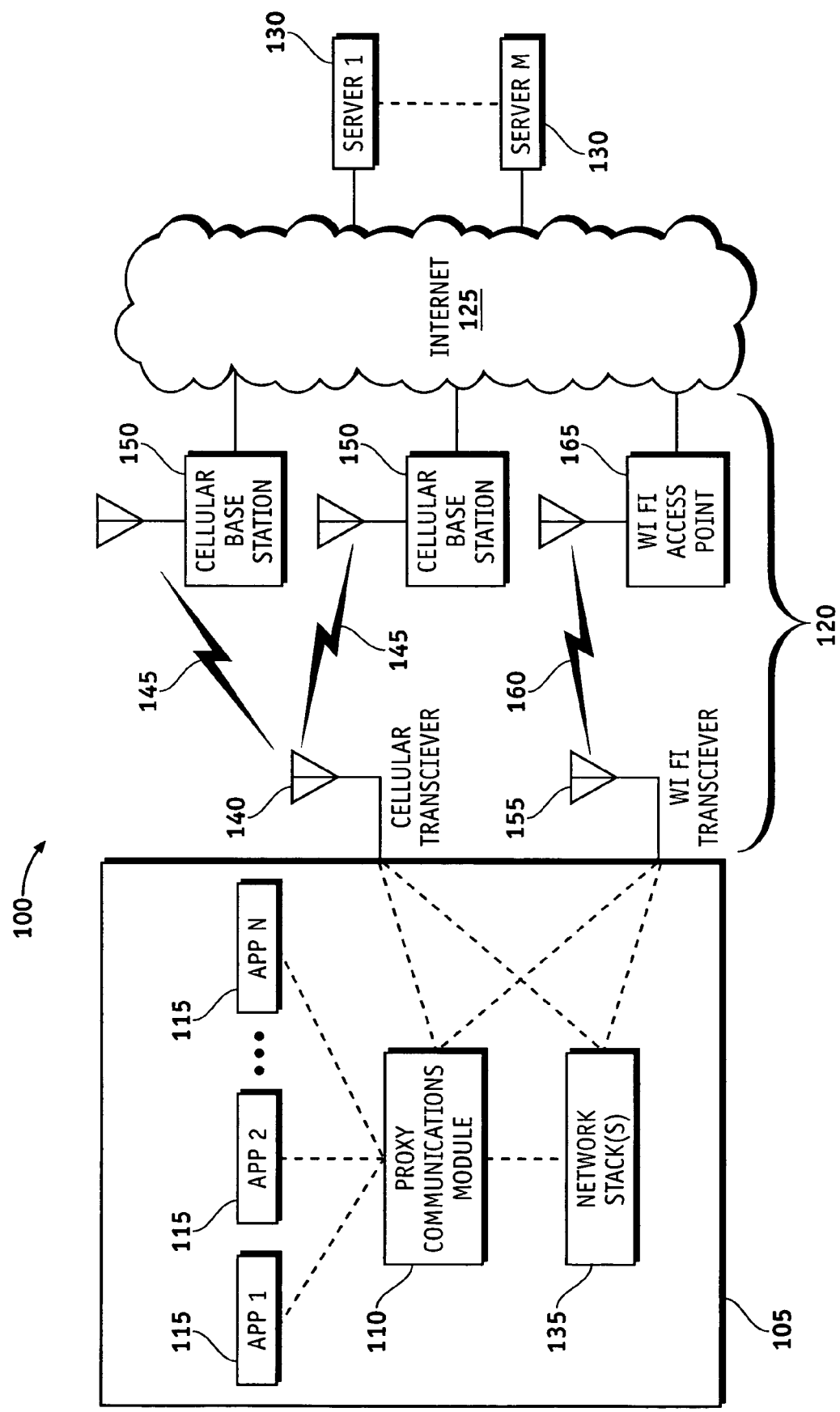
FIG. 1 is a schematic representation of a vehicle communications system utilizing a telematics unit with a proxy communication module providing external data connectivity.

FIG. 1 is a schematic representation of the operational elements of a data communication system 100 configured in accordance with an example embodiment of the invention for a vehicle telematics unit 105 having a proxy communication module 110 that provides external data connectivity for one or more vehicle applications 115. The proxy communication module 110 is configured to communicate wirelessly over at least one wireless data communication channel with one or more servers 130 residing on a network or computer system outside of the vehicle. In one embodiment, the communication channel is established using the internet 125. The servers 130 may be configured to exchange information over not only the global Internet but as used in this specification "web-enabled" or "web-based" also means having the ability to exchange information over any network of interconnected computers in a known manner. Such exchange can be facilitated by the use of known data transmission protocols and data formatting. One or more of the components of the data communication system 100 may include at least one software program for facilitating the communication and the exchange of information between them. In the context of this system, it is assumed that the communication is authenticated and some critical communication may be encrypted.

As used herein, a "data communication channel" means any path, connection, route or link between any two data processing elements, while a "wireless data communication channel" means any such path, connection, route or link that includes at least one wireless segment. In this regard, a data communication channel may include any number of constituent links or segments, which may be compliant over various data communication protocols. In addition, a data communication channel may be established using various hardware components known to those skilled in the art.

The applications 115 request data as needed from servers 130 through the proxy communication module 110. For example, one application may be an engine calibration application that may request the latest software for an engine controller, another application may be an information application that may request current news or weather, etc. The proxy communication module 110 is coupled to a wireless data communication architecture 120, either directly or through a network stack(s) 135. The wireless data communication architecture 120 may include more than one wireless data communication channel available to use for data communication. A first wireless data communication channel may utilize a data-capable cellular transceiver 140. The data-capable cellular transceiver 140 is configured to create a wireless data connection 145 to one or more cellular base stations 150 and to the cellular carrier's data infrastructure. Through the cellular carrier's data infrastructure the remote web-enabled servers 130 may be contacted using the internet 125. If the data connection uses the Internet Protocol (IP) on which the global Internet 125 operates, the data connection 145 on the cellular system typically takes the form of a Point-to-Point Protocol (PPP) session, and the data transmission between the telematics unit 105 and the servers 130 takes the form of a Transmission Control Protocol (TCP) socket connection using a protocol such as Hypertext Transfer Protocol (HTTP). A second wireless data communication channel may include a WiFi channel, in which a WiFi transceiver 155 communicates over a WiFi link 160 to a WiFi access point 165 coupled to the internet 125, through which the remote servers 130 may be accessed. Note that, if a WiFi wireless communications channel is used instead of cellular, the only thing that changes is that PPP is no longer required.

The telematics unit 105 may comprise software and/or hardware that enable the telematics unit 105 to communicate with and program the various components. For example, the telematics unit 105 may comprise computer readable software that is enabled to command the applications 115, proxy communication module 110 and/or network stack(s) 135. The telematics unit 105 may also comprise communication protocols that enable the telematics unit 105 to communicate with the cellular system, WiFi system or any other appropriate wireless communication systems. These communication protocols may be any suitable communication protocols as are known in the art for communicating. The telematics unit 105 may be characterized by one or more microprocessors, memory and application program memory storage. The microprocessor(s) may be any suitable microprocessor as is well known in the art. The memory and memory storage may also be any suitable memory and memory storage known in the art.

The proxy communication module 110 provides external data connectivity for any of the applications 115 in the vehicle. Instead of each of the applications 115 having the required software and hardware to directly communicate with servers 130, the applications 115 use the proxy communication module 110 to perform the desired communications on their behalf (i.e., by proxy). This simplifies the software and hardware requirements for the applications 115 and enables the vehicle telematics unit 105 to be scalable. The proxy communication module 110 can handle many communications scenarios that involve a single request from the client to a server, typically defined by a Uniform Resource Locator (URL), and a single response from the server.

The proxy communication module 110 centralizes communication for the applications 115 and is designed to improve the probability of success of whatever communications it attempts on their behalf, allowing less complex applications 115. Using the proxy communication module 110 allows strategies for communications reliability improvement to be applied uniformly, instead of allowing different implementations in multiple applications 115. In addition, any communications problems are centralized in the proxy communication module 110 and logging of errors is centralized. Also, any improvements, updates and/or changes in communications software may be handled in one place, in the proxy communication module 110, without modifying the applications 115.

Figure 2:
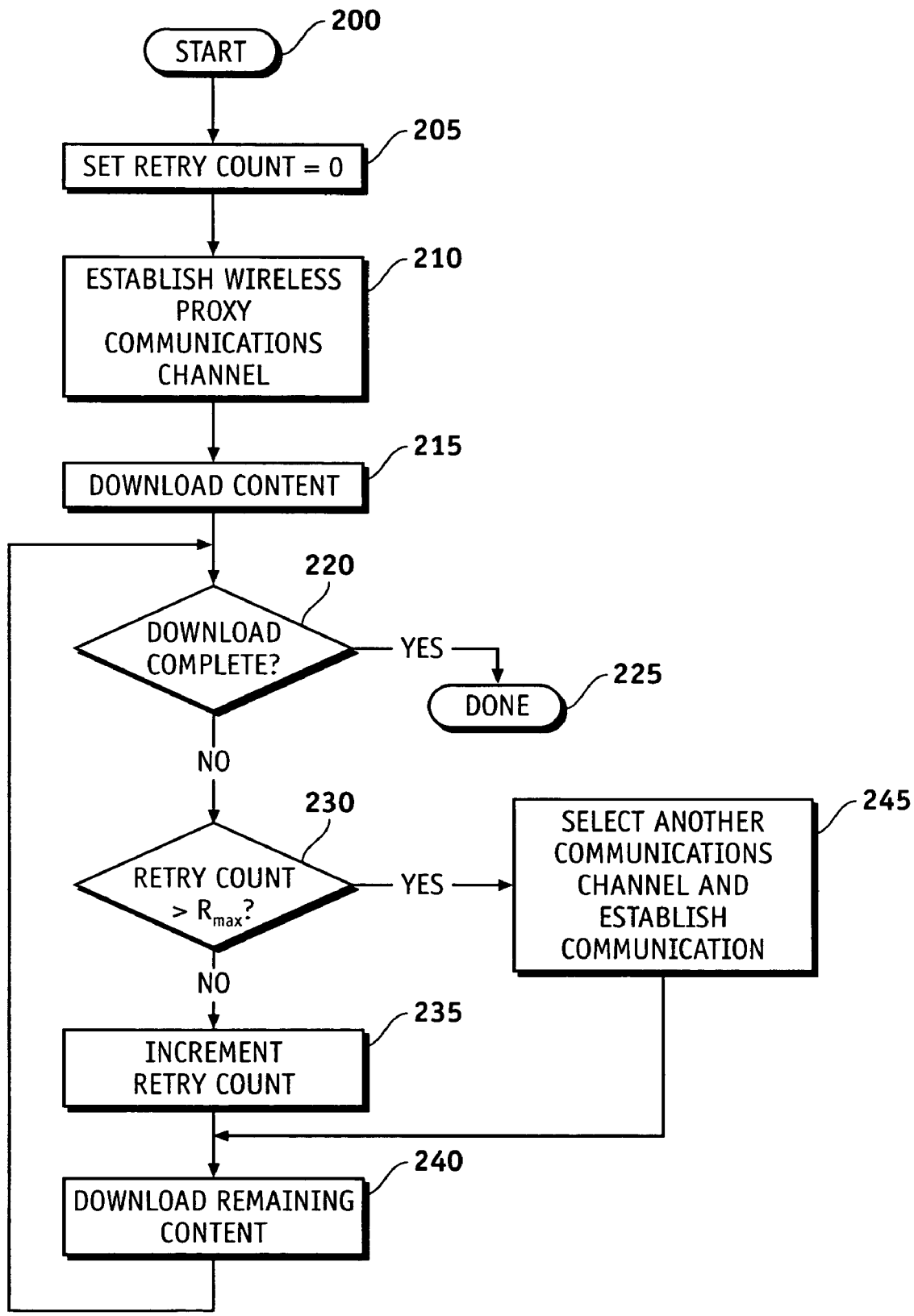
FIG. 2 is a flow diagram showing one implementation of a data download process using a proxy communication module.

The proxy communication module 110 makes a best-effort attempt to connect and retrieve the entire remote data set (located on the servers 130) requested by the applications 115, and then return the data to the requesting applications 115. FIG. 2 is a flow diagram showing one implementation of the proxy communication module 110 using a wireless data communications system for communicating data between one or more applications 115 within a vehicle telematics unit 105 and the server 130 on a web-enabled computer system outside of the vehicle. At step 200, the proxy communication module 110 starts by receiving a request from one or more of the applications 115 to retrieve data located on the servers 130. The proxy communication module 110 sets a retry count to zero at step 205 and chooses a preferred wireless data communication channel that is available and capable of connecting to the server 130 at step 210, such as a cellular channel or a WiFi channel. For example, in some instances WiFi may be the most-preferred data communications channel when the vehicle is close to a WiFi hot spot due to its low cost of connectivity, while a cellular connection may be the most-preferred data communications channel while the vehicle is traveling.

The communication between the proxy communication module 110 and the servers 130 may involve sending data, retrieving data, or both. The proxy communication module 110 then receives the requested data content by downloading it from the servers 130 at step 215. The proxy communication module 110 monitors the download of the requested data and determines if the download of data is complete at step 220. The proxy communication module 110 may collect the requested data until the download is complete. If the proxy communication module 110 determines the download is complete at step 225, the proxy communication module 110 then transfers or communicates the requested data to the requesting application 115 (step 225). In another embodiment, the proxy communication module 110 may communicate the requested data to the requesting application 115 during the download. If the proxy communication module 110 determines the download is incomplete (which may occur after a timeout period has elapsed), the proxy communication module 110 tries to re-establish communications with server 130 over the selected wireless proxy data communication channel at step 230, each time incrementing the retry count by one at step 235. The proxy communication module 110 will continue to try to re-establish communications and retrieve the requested data until either the download is completed with no communication errors at step 240, or the maximum number of tries or attempts has been reached for the selected wireless proxy data communication. If an error occurs during communications, the proxy communication module 110 may log the error to a persistent storage in the telematics module. If a maximum number of tries or error counts has been reached without a successful download of the requested data, and if another wireless proxy data communication channel is available, the process is repeated with the proxy communication module 110 selecting a secondary wireless proxy data communication channel at step 245 and setting a retry count to zero for each of the available channels used. For instance, a typical cellular channel may have both high-speed packet and low-speed circuit-switched data channels available. If there is no success on high-speed packet data channel, the process may be repeated on the low-speed circuit-switched data channel, albeit at a potentially lower communications rate, or use other available data communications channels, for example short-range wireless LAN protocols such as WiFi/IEEE 802.11x or Bluetooth. Each of the high-speed packet data channel, the low-speed circuit-switched data channel and WiFi channel may be selected as a wireless proxy data communication or as an alternate wireless proxy data communication channel depending on the conditions. For example, WiFi may be the most-preferred data communications channel when the vehicle is close to a WiFi hot spot due to its low cost of connectivity, while a cellular connection may be the most-preferred data communications channel while the vehicle is traveling.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A data communication method for a vehicle telematics system, the method comprising:
   receiving a request from one or more vehicle applications to retrieve data from a server on an external network;
   selecting a preferred wireless data communication channel from a plurality of available wireless data communication channels between the vehicle telematics system and the server for use as a wireless proxy data communication channel;
   establishing, in response to the request, the wireless proxy data communication channel between a proxy communication module in the vehicle telematics system and the server;
   receiving requested data from the server via the wireless proxy data communication channel;
   monitoring a download status for the requested data; and
   if the download status is incomplete:
      incrementing a retry count by one;
      re-establishing communication with the server over the selected wireless proxy data communication channel;
      continuing to receive the requested data; and
      if a maximum retry count is reached for the wireless proxy data communication channel;
         selecting another wireless proxy data communication channel from the plurality of available wireless data communication channels for use as a secondary wireless proxy data communication channel;
         establishing the secondary wireless proxy data communication channel between the proxy communications module and the server; and
         receiving the requested data from the server via the secondary wireless proxy data communication channel; and
   communicating the received requested data from the proxy communication module to the one or more vehicle applications.

2. The method of claim 1, further comprising:
   monitoring a download status for the requested data; and
   collecting the requested data until the download status is complete before communicating the received requested data from the proxy communication module to the one or more vehicle applications.

3. The method of claim 1, wherein each wireless data communication channel of the plurality of available wireless data communication channels comprises an available path, connection, route or link that includes at least one wireless segment between the proxy communication module in the vehicle telematics system and the server.

4. The method of claim 1, wherein the preferred wireless data communication channel is selected from the group consisting of a WiFi channel, a high-speed circuit switched cellular channel, a low-speed circuit switched cellular channel, and a Bluetooth channel.

5. The method of claim 1, wherein each wireless data communication channel of the plurality of available wireless data communication channels comprises a channel for sending/retrieving data that includes at least one wireless segment between the proxy communication module and the server.

6. A data communication method for a vehicle telematics system, the method comprising:
 receiving a request from one or more vehicle applications to retrieve data from a server on an external network;
 selecting, in response to the request, a preferred wireless data communication channel from a plurality of available wireless data communication channels between the vehicle telematics system and the server for use as a wireless proxy data communication channel for the vehicle telematics system; and
 establishing the wireless proxy data communication channel between a proxy communication module in the vehicle telematics system and the server;
 receiving requested data from the server via the preferred wireless proxy data communication channel;
 monitoring a download status for the requested data;
 if the download status is incomplete;
  incrementing a retry count by one;
  if a maximum retry count is reached for the wireless proxy data communication channel, the method further comprising:
   selecting another wireless proxy data communication channel from the plurality of available wireless data communication channels for use as a secondary wireless proxy data communication channel;
   establishing the secondary wireless proxy data communication channel between the proxy communications module and the server; and
   receiving the requested data from the server via the secondary wireless proxy data communication channel;
  re-establishing communication with the server over the selected wireless proxy data communication channel;
  continuing to receive the requested data; and
 communicating the received requested data from the proxy communication module to the one or more vehicle applications.

7. The method of claim 6, wherein the preferred wireless proxy data communication channel comprises a data-capable cellular communications link.

8. The method of claim 6, wherein the preferred wireless proxy data communication channel comprises a WiFi communications link.

9. The method of claim 6, wherein the preferred wireless proxy data communication channel comprises a Bluetooth communications link.

10. The method of claim 6, further comprising:
 collecting the requested data until the download status is complete before communicating the received requested data from the proxy communication module to the one or more vehicle applications.

11. The method of claim 6, wherein selecting the preferred wireless data communication channel comprises selecting a high-speed packet data cellular channel from the plurality of available wireless data communication channels for use as the wireless proxy data communication channel.

12. The method of claim 11, wherein selecting another wireless proxy data communication channel from the plurality of available wireless data communication channels for use as the secondary wireless proxy data communication channel comprises selecting a low-speed circuit-switched data cellular channel for use as the secondary wireless proxy data communication channel.

13. A data communication method for a vehicle telematics system, the method comprising:
 receiving a request from one or more vehicle applications to retrieve data from a server on an external network;
 selecting, in response to the request, a high-speed packet data cellular channel from a plurality of available wireless data communication channels between the vehicle telematics system and the server for use as a wireless proxy data communication channel for the vehicle telematics system;
 establishing the wireless proxy data communication channel between a proxy communication module in the vehicle telematics system and the server; and
 when a maximum retry count is reached for the high-speed packet data cellular channel:
  selecting a low-speed circuit-switched data cellular channel for use as a secondary wireless proxy data communication channel;
  establishing the secondary wireless proxy data communication channel between the proxy communications module and the server; and
  receiving the requested data from the server via the secondary wireless proxy data communication channel.

* * * * *